United States Patent [19]

Connolly

[11] Patent Number: 4,487,695

[45] Date of Patent: Dec. 11, 1984

[54] CENTRIFUGE SCREEN BASKET

[76] Inventor: James D. Connolly, P.O. Box 1238, Princeton, W. Va. 24740

[21] Appl. No.: 565,371

[22] Filed: Dec. 27, 1983

[51] Int. Cl.³ .......................... B01D 21/26; B07B 1/12
[52] U.S. Cl. .................................. 210/380.1; 209/303; 209/393; 210/499
[58] Field of Search .............. 209/270, 282, 393, 395, 209/400, 407, 303; 210/380.1, 380.2, 380.3, 360.1, 497.3, 497.01, 498, 499

[56] References Cited

U.S. PATENT DOCUMENTS

| 2,046,458 | 7/1936 | Johnson | 209/393 |
| 3,437,209 | 4/1969 | Evans | 210/380.1 |
| 4,113,626 | 9/1978 | Detcher | 210/409 |
| 4,193,503 | 3/1980 | Connolly | 209/393 |

FOREIGN PATENT DOCUMENTS

| 45868 | 4/1979 | Japan | 209/393 |
| 2033242 | 5/1980 | United Kingdom | 210/380.1 |

*Primary Examiner*—John Adee
*Attorney, Agent, or Firm*—Wilmer Mechlin

[57] ABSTRACT

A screen basket for centrifugal deliquefying and/or classifying of particulate solid and solid-liquid mixtures, the basket being fed internally, rotating about a vertical axis and on initial installation presenting for driving engagement with the mixture fed into it an axially serrated internal screening surface formed by laterally inwardly and forwardly sloping bases of laterally spaced axially extending screen wires having as mixture-engaging serrations radially instanding leading edges.

5 Claims, 5 Drawing Figures

CENTRIFUGE SCREEN BASKET

BACKGROUND OF THE INVENTION

Usually conical, or, more precisely, frusto-conical, and rotatable about a vertical axis, a centrifuge screen basket, whether upright or inverted, ordinarily is fed through its smaller end with the material or mixture to be deliquefied and/or classified. In any case, it is the rotary movement of the basket imparted to it by the centrifuge and transmitted through it to the material fed into it that produces the centrifugal force responsible for the deliquefying and/or classifying of the material by driving liquid and any small particle content of the material radially outwardly through openings in the screening surface of the screen basket. Movement of the material upwardly or downwardly along the screening surface of the basket to the basket's outlet or discharge end may be produced in a continuous operation either by an independently rotatable feed screw inside the basket or and more usually by vibrating the basket horizontally or vertically.

Due to its greater strength and relative freedom from clogging, a type of conical centrifuge screen basket widely used has a screening area formed by laterally spaced, axially or longitudinally extending, wedge-shaped screen wires backed and connected externally by being welded at the back to longitudinally spaced circumferential tie bands or bars and having the inner or internal screening or flow surface of its screening areas formed by the bases or inner faces of the screen wires. If, as usual, flat and laterally disposed tangentially of the cone bounded or contained by the basket's screening surface or perpendicular or normal to a bisecting radial plane, the bases of the screen wires, when the basket is initially installed in a centrifuge, present to the material fed into the basket a smooth screening surface interrupted only by the conventionally V-shaped, outwardly flaring slots between the screen wires. Consequently, whether or not the basket is made as usual of a plurality of conical segments or panels welded together along their adjoining edges, the smooth screening surface initially presented to the material fed into the basket is inefficient or relatively ineffective in imparting rotary movement and consequent centrifugal force to the material. This condition of relative slippage of the interfaces of the basket and material will prevail, usually for several hours, until the abrasion by the material of the screening surface has roughened the latter to the point where the friction between the interfaces enables the basket to impart its rotary movement efficiently to the material. It is this condition, which heretofore has rendered centrifuge screen baskets of the welded screen wire—tie band type inefficient when initially installed, that the present invention is primarily concerned with rectifying.

SUMMARY OF THE INVENTION

The primary objective of the present invention is to provide an improved centrifuge screen basket having an internal screening surface formed by inner faces of laterally spaced screen wires, wherein the inner faces of the wires are so disposed and configured as on initial installation of the basket to present a longitudinally serrated surface for driving engagement with material fed into the basket.

Another object of the present invention is to provide an improved centrifuge screen basket having an internal screening surface formed by inner faces of laterally spaced screen wires, wherein the inner faces of the wires slope inwardly of the basket toward leading edges thereof for presenting on initial installation of the basket a longitudinally serrated screening surface for driving engagement with material fed into the basket.

A further object of the invention is to provide an improved conical centrifuge screen basket having an internal screening surface formed by inner faces of laterally spaced longitudinally extending screen wires externally backed and connected by longitudinally spaced circumferential tie bands welded to backs of the screen wires, wherein the inner faces of the screen wires slope inwardly of the basket toward their leading edges for presenting on initial installation of the basket a longitudinally serrated screening surface for driving engagement with material fed into the basket.

An additional object of the invention is to provide a conical centrifuge screen basket, whereof a screening area is formed by longitudinally extending laterally spaced screen wires externally backed and connected by longitudinally spaced circumferential tie bands, wherein flat inner faces of the screen wires form an internal screening surface of the basket, the screen wires instand radially from the tie bands and leading sides of the screen wires are deeper than their trailing sides for causing their faces to slope inwardly of the basket toward their leading edges.

Another object of the invention is to provide a conical centrifuge screen basket, whereof a screening area is formed by longitudinally extending laterally spaced screen wires externally backed and connected by longitudinally spaced circumferential tie bands, wherein leading and trailing sides of the screen wires are of equal depth and the screen wires are tilted relative to the tie bands counter the direction of rotation of the basket for causing the inner faces of the wires to slope inwardly of the basket toward their leading edges.

The foregoing and other objects and advantages of the invention will appear hereinafter in the detailed description, be particularly pointed out in the appended claims and be illustrated in the accompanying drawings, in which:

FIGURE DESCRIPTION

DETAILED DESCRIPTION

Figure 1:
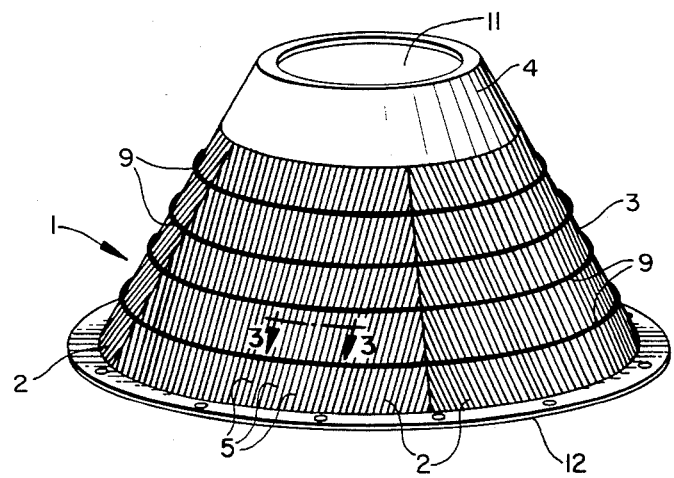
FIG. 1 is a perspective view of the improved centrifuge screen basket of the present invention.
Figure 2:
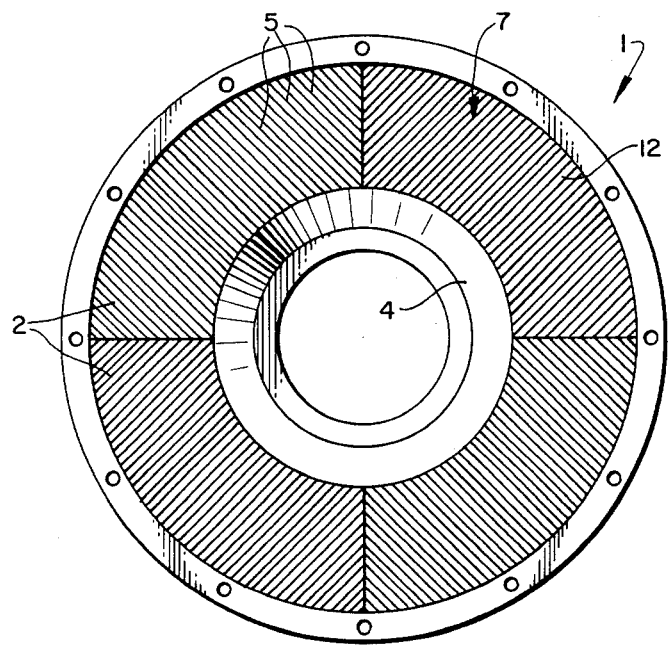
FIG. 2 is a bottom plan view of the basket of FIG. 1.

Referring now in detail to the drawings in which like reference characters designate like parts, the improved centrifuge screen basket of the present invention is designed for use in centrifuges for centrifugally deliquefying and/or classifying particulate solid or solid-liquid materials or mixtures, such as coal slurries, in which centrifugal force is applied for separating liquids and/or smaller particulate solids from material fed into the basket and the material in a continuous operation is moved along a screening surface of the basket by vibrating the basket or, sometimes, by an independently rotatable feed screw.

As in my copending application Ser. No. 405,928, filed Aug. 6, 1982, the centrifuge screen basket of the present invention, designated as 1, preferably is conical or, more precisely frusto-conical, and rotatable about a vertical axis and conviently is formed of a plurality of separately fabricated, suitably duplicate conical segments or panels 2, each welded at sides to adjoining segments. Again, as in that application, the basket 1 may have a screening area 3 extending its full height or length or, when its smaller end portion 4 will be subjected to excessive abrasion, may have that portion formed as an imperforate feed cone welded to the screening area. In either case, the screening area 3 is formed of a plurality of laterally spaced, longitudinally or axially extending screen wires 5 of wedge or triangular shape, inwardly facing suitably flat bases or inner faces 6 of which together form the basket's internal screening or flow surface 7. Laterally spaced by outwardly flaring, longitudinally or axially extending, V-shaped slots or openings 8, the screen wires 5 are externally backed and connected by axially or longitudinally spaced circumferential tie bands or bars 9 welded to the usually rounded backs or apexes 10 of the screen wires. For maximum strength of the basket, the preferred tie bands 9 are the laterally elongated or relatively wide bands shown in my copending application, which, while welded only on one edge portion to the screen wires, back the wires over their entire width.

When installed in a centrifuge (not shown), usually with its axis vertical, the basket 1 is drivably connected to drive mechanism (not shown) in the centrifuge preferably suitable for both vibrating and rotating the basket about its axis and the basket is fed through its smaller or feed end 11 with the material or mixture, liquid and/or solid components of which are to be separated. It is the vibrating of the basket or, alternatively, an independently rotatable feed screw (not shown) that moves the material along the screening surface 7 toward the basket's larger or solids-discharge end 12, while it is the rotation of the basket transmitted to the material fed into it that produces the centrifugal force responsible for the separation by driving any liquid and small particle components outwardly through the slots 8. After several hours of use, the abrading action on the screening surface 7 of the solids in the material fed into the basket, such as the relatively hard particles of coal in a coal slurry, will roughen the surface sufficiently to enable the friction between the interfaces of the material and screening surface to rotate the material with the basket and produce the desired efficient centrifugal separation. However, if, as in the conventional centrifuge screen basket in which the inner faces of the screen wires are each tangential to the conical surface included or bounded by the screening surface, during the several hours or other interval of initial operation there will be substantial slippage rather than positive driving engagement of the interfaces and the centrifugal separation obtainable, particularly of liquid components, will be of low order and relatively ineffective.

Screen baskets, even of the exemplary welded screen wire-tie bar type, are short-lived relative to the centrifuges in which they are used and at intervals must be replaced. Consequently, the initial interval of as much as several hours of inefficient centrifugal separation due to slippage between the interfaces of the material fed into the basket and the screening surface of a conventional basket, is a continuously recurring condition during the operation of a centrifuge that results in an inordinate waste of time and energy. This condition the screen basket 1 of the present invention alleviates by having its screen wires so disposed and configured that on initial installation of the basket, they present to material fed into it a longitudinally serrated, ribbed or ridged screening surface 7 drivingly engageable with the confronting surface of the material so as to impart to the material the rotative movement of the basket and thereby produce the centrifugal force responsible for the desired deliquefying and/or classifying by driving any liquid and/or fine particle content or component of the material outwardly through the slots 8 in the screening surface. For such driving engagement with the material, each screen wire 5 must be so disposed and configured as to have a longitudinally extending, preferably coextensive, abutment or shoulder 13 which not only faces in the direction of the rotation of the basket but instands radially from the screening surface 7 sufficiently to project into and engage or grip the confronting interface or surface of the material.

Figure 3:
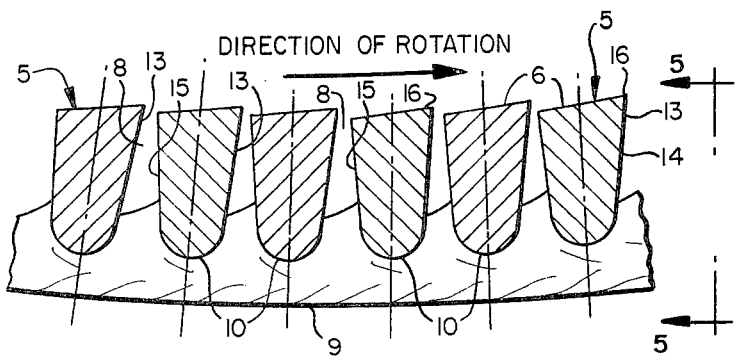
FIG. 3 is a fragmentary horizontal sectional view on an enlarged scale taken along lines 3—3 of FIG. 1, showing one embodiment of the screen wires of the improved basket.
Figure 4:
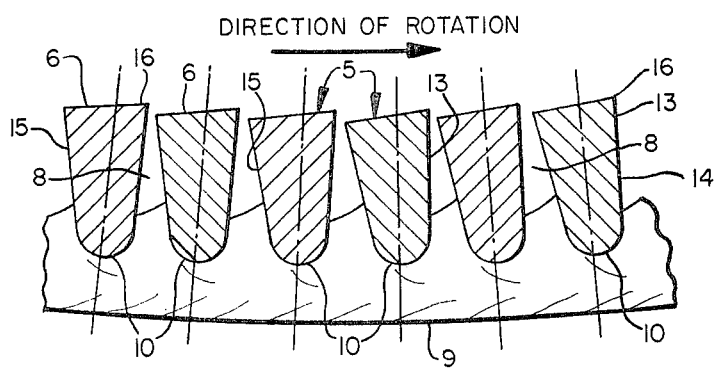
FIG. 4 is a fragmentary horizontal sectional view on the same section of FIG. 3 but showing a second embodiment of the screen wires.
Figure 5:
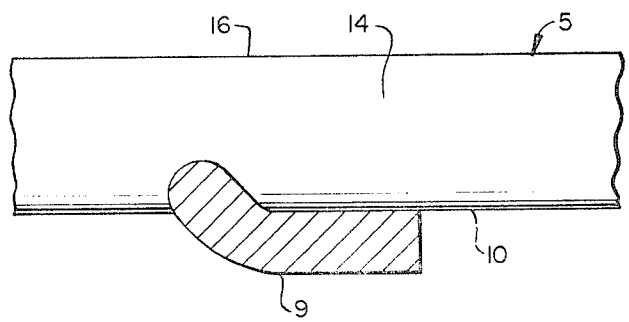
FIG. 5 is a fragmentary vertical sectional view taken along lines 5—5 of FIG. 3.

As exemplary of the screen basket of the present invention, two forms of abutments 13 suitable for the above purpose are illustrated. In one form, that of FIG. 4, the wedge-shaped screen wires 5, as drawn, have leading and trailing sides 14 and 15, respectively, of equal depth or width and, when welded to the bands 9, are tilted rearwardly or counter the direction of the rotation of the basket relative to the junctions of their backs 10 with the tie bands, so that leading sides of the wires become the desired forwardly facing instanding abutments 13 drivably engageable with the material fed into the basket. In the other form shown in FIG. 3, the wedge-shaped screen wires 5, as drawn, have their leading sides deeper or wider than their trailing sides 15 and, when welded to the tie bands 9, instand radially therefrom, thus presenting by their deeper leading sides the desired forwardly facing instanding abutments 13.

In either form of the abutments 13, the bases 6 of the screen wires 5 laterally slope or are inclined inwardly of the basket, relative to intersecting radial planes indicated in dot-and-dash lines, toward the leading edges 16 of both the bases and the wires and those edges for improved gripping of the material preferably are sharp when the basket is initially installed. However, after several hours of operation, the initially sharp leading edge 16 of the screen wires 5 will have been dulled or worn down by the abrading action of the material in the basket but this is of no disadvantage since by then the same action has roughened the bases 6 of the screen wires to the point where the frictional resistance to relative rotation between the screening surface 7 and the material suffices to enable the rotation of the basket to be imparted efficiently to the material.

From the above detailed description it will be apparent that there has been provided an improved centrifuge screen basket of the welded screen wire-tie bar type which operated effectively in centrifugally deliquefying and/or classifying materials fed into the basket by presenting a screening surface drivably engageable with the material both on initial installation and throughout the effective life of the basket. It should be understood that the described and disclosed embodiments are merely exemplary of the invention and that all modifications are intended to be included that do not depart from the spirit of the invention and the scope of the appended claims.

Having now described my invention, I claim:

1. A screen basket rotatably mountable in a centrifuge for deliquefying and/or classifying material, comprising a screening area formed by a plurality of laterally spaced longitudinally extending screen wires exteriorly backed and connected by longitudinally spaced circumferential tie bands welded to backs thereof, said screen wires forming by inner faces thereof an internal screening surface of said screening area, and said inner faces being so disposed and configured as on initial installation of said basket to present to material fed into said basket longitudinally extending serrations operative on rotation of said basket to drivingly engage said material.

2. A frusto-conical screen basket rotatably mounted in a centrifuge, said basket having a screening area formed by a plurality of laterally spaced longitudinally extending wedge-shaped screen wires externally backed and connected by longitudinally spaced circumferential tie bands welded to backs thereof, comprising an internal screening surface of said screening area formed by inner faces of said screen wires, said inner faces laterally sloping inwardly of said basket and forwardly toward leading edges thereof for presenting on initial installation of said basket to material fed thereinto longitudinally extending serrations operative on rotation of said basket to drivingly engage said material.

3. A frusto-conical screen basket rotatably mountable in a centrifuge, said basket having a screening area formed by laterally spaced longitudinally extending wedge-shaped screen wires externally backed and connected by longitudinally spaced circumferential tie bands welded to backs thereof, comprising flat bases on said screen wires together forming an internal screening surface of said screening area, said screen wires being so disposed and configured as on initial installation of said basket to present to material fed thereinto longitudinally extending circumferentially spaced abutment means operative on rotation of said basket to drivingly engage said material.

4. A frusto-conical centrifuge screen basket according to claim 3, wherein the screen wires as drawn have leading and trailing sides of substantially equal width and as welded to the tie bands are tilted rearwardly counter the direction of rotation of the basket and said leading sides are the abutment means.

5. A frusto-conical centrifuge screen basket according to claim 3, wherein the screen wires as drawn have leading sides wider than trailing sides thereof and as welded to the tie bands instand radially therefrom and said leading sides are the abutment means.

* * * * *